United States Patent [19]

Spence-Bate et al.

[11] 4,176,947
[45] Dec. 4, 1979

[54] STEP AND REPEAT MECHANISM

[75] Inventors: Harry A. H. Spence-Bate, 1 Cheam Pl., Morley, Australia, 6062; Timothy Bain-Smith, Charing, England

[73] Assignee: H. A. H. Spence-Bate, Australia

[21] Appl. No.: 838,724

[22] Filed: Oct. 3, 1977

[30] Foreign Application Priority Data

Oct. 4, 1976 [GB] United Kingdom ............... 41118/76

[51] Int. Cl.² ...................... G03B 27/32; G03B 27/42; G03B 27/62
[52] U.S. Cl. ........................................ 355/53; 355/64; 355/76
[58] Field of Search ....................... 355/53, 64, 73, 76, 355/86, 87, 95

[56] References Cited
U.S. PATENT DOCUMENTS

| Re. 21,365 | 2/1940 | McCarthy et al. ..................... 355/64 |
| 2,748,651 | 6/1956 | Simjian .................................... 355/64 |
| 3,103,850 | 9/1963 | Khoury et al. .......................... 355/76 |
| 3,674,367 | 7/1972 | Chapman ............................. 355/53 X |

OTHER PUBLICATIONS

I.B.M. Technical Disclosure Bulletin, vol. 4, No. 10, 3/1962, p. 8.
I.B.M. Technical Disclosure Bulletin, vol. 15, No. 9, 2/1973, pp. 2730-2731.

Primary Examiner—Donald A. Griffin
Attorney, Agent, or Firm—Fidelman, Wolffe & Waldron

[57] ABSTRACT

Apparatus for moving sheet material, primarily microfiche, into a plurality of X and Y axis positions by means of a gas cushion formed on a plate in which the sheet material is shifted by means of ducted gas jets or sweeps; location of the sheet material is achieved by means of movable stops, sweeps or sensors; the stops are controlled by electromagnets or pneumatic means; a feed device is provided in one example to feed the sheet material onto the gas cushion and to enable removal of the sheet material from the apparatus.

17 Claims, 8 Drawing Figures

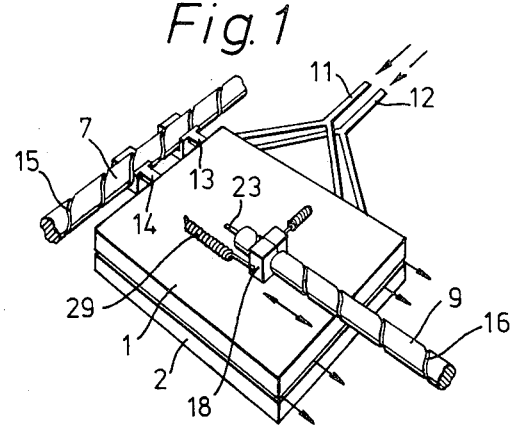
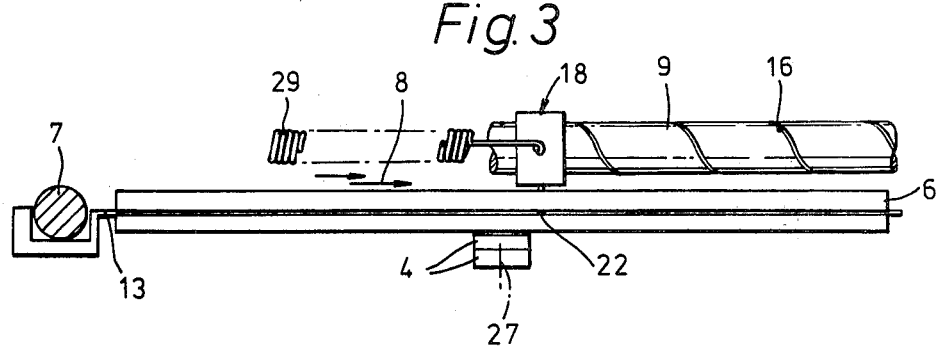
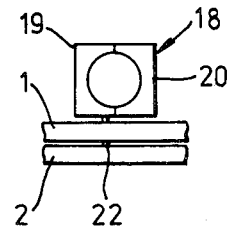 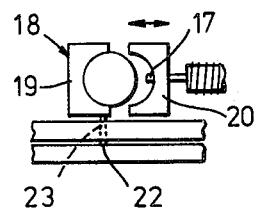

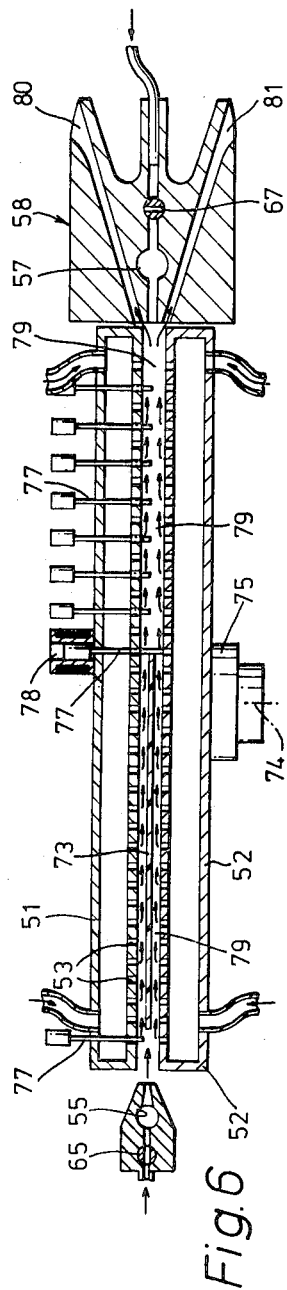
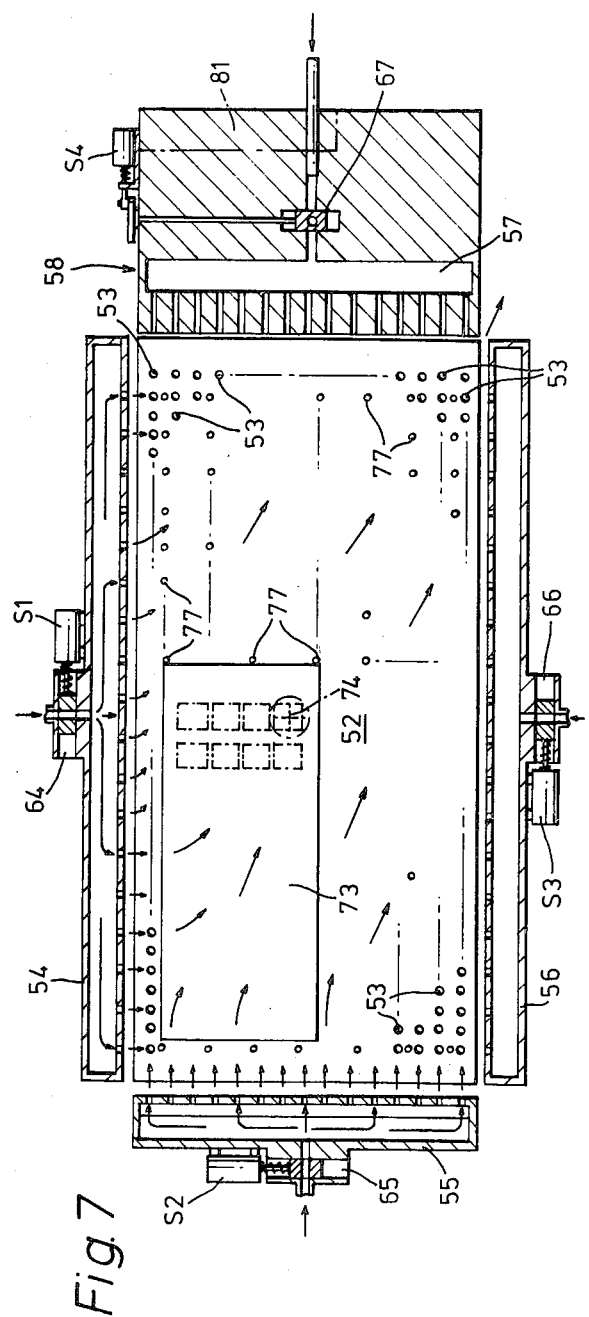

STEP AND REPEAT MECHANISM

The present invention relates to apparatus and a method of moving a microfiche in a microfiche camera.

Known microfiche cameras use a carriage holding a microfiche, which carriage is moved by several means notably, according to a previous invention of mine, by helical drive drums which are aligned in the X and Y axis of the microfiche and which move the carriage in the X and Y direction relative to a camera lens. Such an arrangement although accurate is limited in its speed of action by the inertial and frictional forces, due to the weight of the carriage and also the consequential frictional resistance on the drive drums.

In order to overcome or reduce this problem, it is proposed to reduce the size of the carriage until effectively it no longer exists.

According to the invention there is provided a microfiche camera having a camera lens, a plate mounted to the camera in the region of the lens, means for maintaining a cushion of gas on the plate to support a microfiche in a plurality of X and Y positions relative to the lens and means for moving the microfiche across the plate to any of the plurality of X and Y positions.

Preferably the camera has two opposed plates in the region of the lens at least one plate having ducts formed therein arranged to direct a flow of gas for said cushion towards a space between the plates into which a said microfiche can be inserted.

At least one said plate can be provided with ducts arranged to direct a flow of gas towards one side of the or each plate, which ducts may be the same ducts arranged to direct a flow of gas for said cushion.

In order to locate a said microfiche relative to the camera lens, this can be achieved by means of stops which are moveable into the space between the plates, which stops may be controlled by electromagnets activated by programming means which enables selection of at least one or a series of said electromagnets to move one or more stops into microfiche frame locating positions. Such an arrangement would eliminate all moving parts from the microfiche moving means except for the stops themselves where the inertial problems would be slight.

Alternatively, the means for moving the microfiche could comprise one or more sweep members moveable between the plates to push the edge of the microfiche in a required direction which sweep member or members would be moved by means of a helically grooved drum, such as is disclosed in my U.S. Pat. Nos. 3,628,865 and 4,015,901.

In order to obtain a fast return of the sweep member or members to the start of a row or column of frames on the microfiche the sweep member or members may be disengaged from engagement in the groove or grooves of the helically grooved drum and returned by a resilient means to the start of the row or column.

The invention will now be described with reference to the accompanying drawings, in which:

FIG. 1 is a perspective view of one embodiment according to the invention;

FIG. 3 is a side view of both gas cushion plates as seen from AA in FIG. 2;

FIG. 4 shows part of the X shift and return arrangement for the embodiment shown in FIG. 1;

FIG. 5 shows the arrangement of FIG. 4 in a release position;

FIG. 6 shows a side view of a second embodiment of the invention;

FIG. 7 is a plan view of a lower gas cushion plate for the embodiment of FIG. 6.

Figure 2:
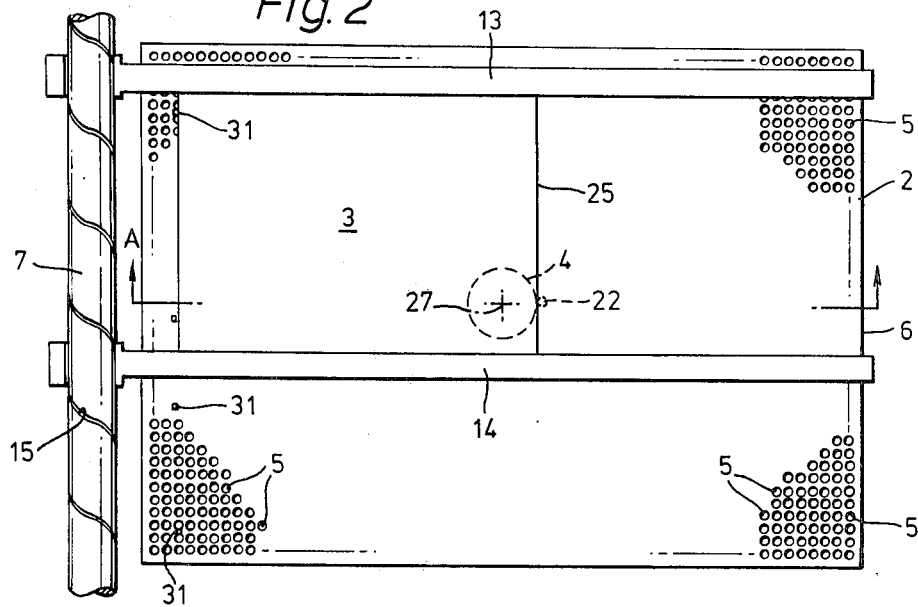
FIG. 2 is a plan view of a lower gas cushion plate for the embodiment of FIG. 1.

In FIG. 1 there is shown upper and lower gas cushion plates 1 and 2 between which a microfiche 3 (see FIG. 2) is supported on a gas cushion. Below the lower gas cushion plate a camera lens, shutter and mask are located in a housing 4 (see FIG. 3). The microfiche 3 is supported by means of an upper and lower cushion fed from jets 5 (see FIG. 2) which are inclined to the vertical towards the edge 6 remote from a Y shift helically grooved drum 7. The inclination of the jets 5 sets upper and lower cushions between the microfiche and upper and lower plates, moving in the direction 8 as shown in FIG. 3, towards the edge 6. The jets are supplied with gas (suitably air) pressure by means of ducts 11 and 12.

The purpose of the present arrangement is to provide a step and repeat mechanism in a microfiche camera, and in order to control the stepping of the microfiche 3 from one frame position to another two helically grooved drums 7 and 9 are used for Y and X shift respectively. Driven by the helix on the drum 7 are two means for moving the microfiche comprising sweep members 13 and 14 which are positioned apart so as to abut on two sides of the microfiche 3. The helix 15 on the drum 7 serves to drive the two sweep members 13 and 14 to any one of a number of predetermined Y positions for shifting the microfiche relative to the camera lens in the housing 4.

In order to shift the microfiche 3 in an X direction, a groove 16 on drum 9 drives a groove follower 17 mounted on a drive block 18 which splits into two parts 19 and 20, the purpose of which will presently be described. The part 19 of the drive block in turn is attached to a probe 22 which passes through a slot 23 in the upper plate 1 and acts as a stop for the edge 25 of the microfiche 3 remote from the helically grooved drum 7 along an X axis, passing through optical axis 27 of the camera lens. X axis shift of the microfiche 3 is achieved by shifting the probe 22 in the X direction, and by constantly moving the microfiche 3 into engagement with it by means of the inclined jets 5.

In order to return the microfiche 3 in an X direction back towards drum 7 after the microfiche has reached its extreme X direction position nearest to the edge 6 of the plate 2, the drive block 18 is split, as shown in FIG. 5, so as to release the groove follower 17 from the groove 16 whereupon a spring 29 acts on part 19 of the drive block 18 which flicks the probe 22 back towards the end of its groove 29 to return the fiche 3 back towards the drum 7. A new row of frames on the microfiche 3 is then selected by shifting the sweep members 13 and 14 in a Y direction. Stops 31 adjacent the drum 7 are provided on the lower plate 2 to stop the microfiche 3 from moving out of the plates. Suitable grooves (not shown) are provided in sweep members 13 and 14 so as to pass over the stops 31.

A second embodiment is now described with reference to FIGS. 6 and 7.

In FIG. 6 upper and lower cushion plates 51 and 52 are provided. Each plate has vertical gas cushion jets 53 and side horizontal jet manifolds 54, 55, 56 and 57. Jet manifold 57 is mounted in a fiche inlet and outlet feed device 58. Movement in the X axis is achieved by opening valve 65 or 67 in supply ducts to manifolds 55 and 57 respectively and movement in the Y axis is achieved by opening valves 64 and 66 respective so that horizontal jets of gas deflect the vertical cushions formed by jets 53.

Location of the microfiche 73 with respect to optical axis 74 of camera lens system 75 is achieved by vertical movement of probes 77 activated by solenoids 78 (only one being shown for clarity). The probes 77 are shifted into or out of the space 79 between the plates 51 and 52.

The activation of the solenoids 78 is preferably carried out using an electronically controlled programming control mechanism, but for the sake of simplicity a simple electrical control system could be used using a series of drums formed as rotary switches, each drum having contacts for activation probes aligned in the Y axis and locating the microfiche in the X axis. At the end of one revolution a succeeding drum is brought into operation and a new row of probes in the X axis are pushed into the space 79 between the plates and the previous row removed. The jet manifold 54 deflects the microfiche 73 onto the new set of probes. Return of the microfiche to the start of the new row is achieved by the drum having a contact opening manifold valve 67 and closing valve 65.

In order to insert microfiches into the space 79 between the plates 51 and 52 the device 58 is moved downwards so that a sloping inlet passage 80 is aligned with space 79, a microfiche being dropped down the passage into the cushion. For removal of microfiches the device 58 is moved upwards so that a sloping outlet passage 81 is aligned with space 79 and by operation of manifold 55 microfiches can be blown out of the space 79 down passage 81 to remove them from the camera or for transfer to a titling station in the camera.

Figure 8:
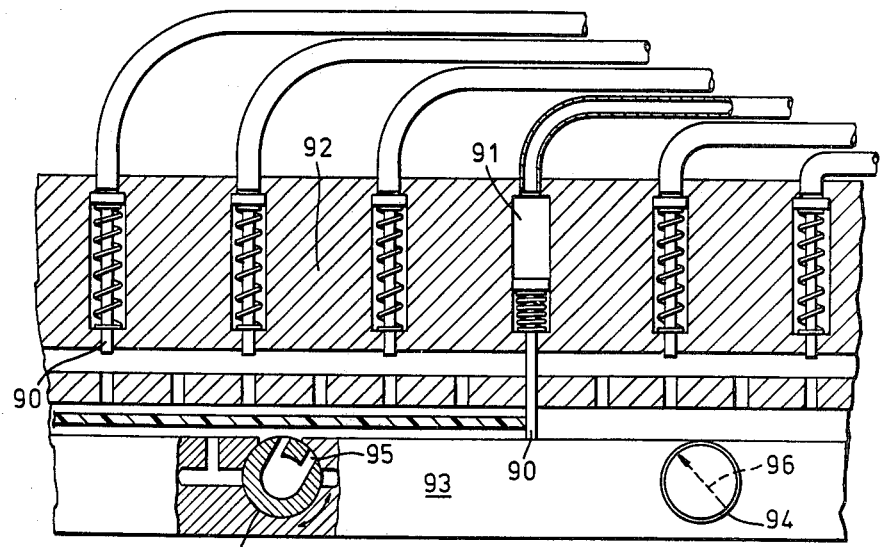
FIG. 8 is a sectional view of a third embodiment.

In FIG. 8 a largely pneumatic arrangement is shown where stops 90 are activated by pneumatic cylinders 91 in a top plate 92. The action is similar to that shown in FIGS. 6 and 7. In the bottom plate, however, semi rotary gas jet activators 94 are provided which can be partially rotated so that gas jets 95 can face either toward one side of the plates 92 and 93 as shown in firm lines in the drawing or toward an opposite side of the plates as indicated by broken line 96.

This same semi rotary gas jet activation can be used in the arrangement shown in FIGS. 6 and 7.

In a further arrangement (not shown) the semi rotary gas jet activators can be used without stops. The location in predetermined X and Y positions is achieved by positioning a plurality of sensors, preferably dielectric sensors between the plates which on sensing the predetermined X and Y position cause a signal to be transmitted to a solenoid valve which shuts off cushion gas supply on one side of the microfiche. The microfiche is then caused to engage with one plate or the other to retain the microfiche in the sensed location. The supply to the semi rotary gas jet activators is cut off in one arrangement and in another arrangement the activators are rotated so the jets face perpendicular to the plane of the plates and the jets assist in holding the microfiche to the opposed plate.

What I claim is:

1. A microfiche camera having a camera lens, a plate mounted to the camera in the region of the lens, means for maintaining a cushion of gas on the plate to support a microfiche in a plurality of X and Y positions relative to the lens and means for moving the microfiche across the plate to any of the plurality of X and Y positions.

2. A camera as claimed in claim 1 having two opposed plates in the region of the lens, at lease one plate having ducts formed therein arranged to direct a flow of gas for said cushion towards a space between the plate into which a said microfiche is insertable.

3. A camera as claimed in claim 2 wherein said plate or at least one said plate is provided with further ducts arranged to direct a flow of gas towards one side of the or each plate.

4. A camera as claimed in claim 2 wherein said ducts are arranged to direct a flow of gas towards one side of the or each plate.

5. A camera as claimed in claim 2 wherein stops are provided on said plates movable into the space between the plates.

6. A camera as claimed in claim 5 wherein the stops are controlled by electromagnets activated by programming means enabling selection of at least one or a series of said electromagnets to move one or more stops into microfiche frame locating positions.

7. A camera as claimed in claim 2 wherein at least one sweep member is mounted for movement between the plates to push an edge of a microfiche in a required direction.

8. A camera as claimed in claim 7 wherein the or each sweep member is moved by means of a helically grooved drum.

9. A camera as claimed in claim 8 wherein the or each sweep member is disengagable from the drum and is returned by a resident means to a microfiche staring position.

10. A camera as claimed in claim 2 wherein a microfiche feed device is provided adjacent one edge of the plates, said device comprising a microfiche inlet chute and an outlet chute, the device being movable in a direction perpendicular to the planes of the plates so as to align the inlet or outlet chutes with the space between the plates.

11. A camera as claimed in claim 10 wherein the device is further provided with a gas inlet and outlets directable towards the space between the plates.

12. A camera as claimed in claim 10 wherein gas outlets are directable towards the space between the plates from a side of the plates opposite said device.

13. A camera as claimed in claim 10 wherein gas outlets are directable towards the space between the plates from a side adjacent the side of the plates at which said device is positioned.

14. A camera as claimed in claim 2 comprising sensors provided between the plates X and Y, position selection means, said sensors co-operating with the selection means to cause a microfiche between the plates to be biassed onto one said plate at a selected position.

15. Apparatus for moving sheet material in X and Y positions relative the plane of the sheet material comprising two opposed plates extending in a direction parallel to said plane between the extremities of the X and Y movement, said plates being separated to provide a space therebetween, ducts formed in at least one of said plates opening into said space to form a gas cushion in said space between the plates for supporting said sheet material in said space, said ducts extending across said extremities to provide support of the sheet material across the extent of said extremities, stops provided on one said plate and movable into said space, means for directing a flow of gas on the sheet material in a direction from one edge of the plates towards another edge so the sheet material is urged onto the stops which can be selectively moved into the space to position the material in any of a plurality of X and Y positions.

16. Apparatus for moving sheet material comprising two opposed plates, said plates being separated to provide a space therebetween, ducts formed in at least one of said plates opening into said space to form a gas cushion in said space between the plates for supporting said sheet material in said space, one or more sweep members positioned for movement between the plates to locate an edge of the sheet material in a required X and Y position between the plates.

17. Apparatus for moving sheet material in X and Y positions relative the plane of the sheet material comprising two opposed plates extending in a direction parallel to said plane between the extremities of the X and Y movement, said plates being separated to provide a space therebetween, ducts formed in at least one of said plates opening into said space to form a gas cushion in said space between the plates for supporting said sheet material in said space, said ducts extending across said extremities to provide support of the sheet material across the extent of said extremities, means for detecting the location of the sheet material at a predetermined position, means for deflecting the material into engagement with one said plate at said predetermined position whereby the material is held in said predetermined position.

* * * * *